(No Model.)

L. T. DARNAULT.
PNEUMATIC TIRE.

No. 594,232. Patented Nov. 23, 1897.

Witnesses.

Inventor
Leo Thomas Darnault.
by Wm N Finckel
his Atty

UNITED STATES PATENT OFFICE.

LEO T. DARNAULT, OF LONDON, ENGLAND.

PNEUMATIC TIRE.

SPECIFICATION forming part of Letters Patent No. 594,232, dated November 23, 1897.

Application filed July 9, 1896. Serial No. 598,533. (No model.)

*To all whom it may concern:*

Be it known that I, LEO THOMAS DARNAULT, a citizen of the United States, residing at Gunnersbury, London, in the county of Middlesex, England, have invented certain new and useful Improvements in or Relating to Pneumatic Tires for the Wheels of Velocipedes and other Vehicles, of which the following is a specification.

The object of this invention is to facilitate the repair of punctures in pneumatic tires; and the invention consists in placing in the air-tube a suitable quantity of dry pulverized or granulated vulcanized rubber, this powder being quite free and unattached within the tube and adapted to be accumulated about a puncture by the insertion through the puncture of an adhesive solution, as I will proceed now more particularly to set forth and finally claim.

Figure 1:
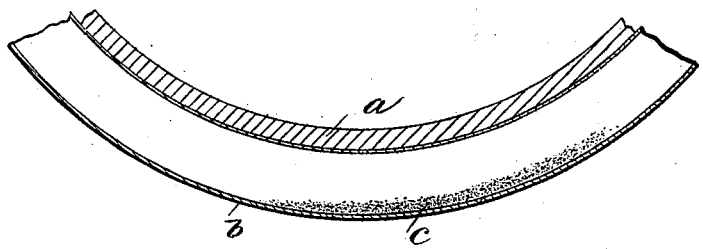
Figure 2:
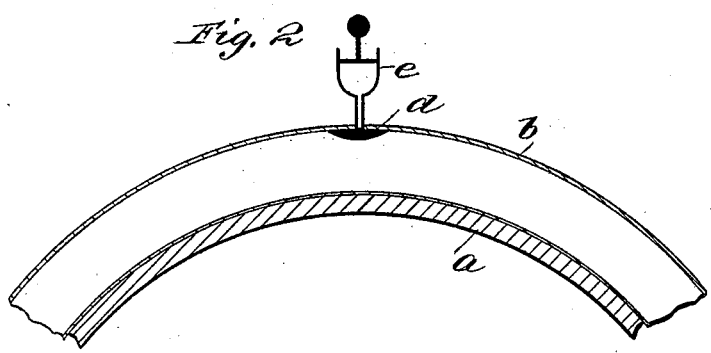
Figure 3:
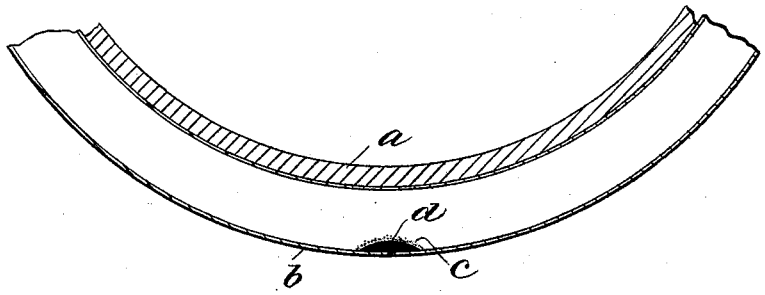

In the accompanying drawings, illustrating my invention, in the several figures of which like parts are similarly designated, Figure 1 is a section of a tire attached to a wooden rim and having my invention applied thereto. Fig. 2 shows the upper part of a tire and rim with the squirt or syringe in position, having forced a quantity of rubber solution through the puncture; and Fig. 3 shows the solution over the puncture, with the pulverized or granulated vulcanized rubber accumulated over the solution.

In the drawings, *a* is the rim, and *b* is the tire.

*c* is the dry pulverized or granulated vulcanized rubber placed loosely and free to move within the tire.

*d* is a spot or blob of rubber solution or other adhesive injected within the tire through a puncture by means of an ordinary squirt or injector *e*.

In practicing my invention on a puncture occurring I introduce rubber solution or other adhesive through the puncture, which solution adheres to the inner surface of the tube about the puncture and thereby forms a spot or blob, as shown in Fig. 2, and then by placing the tire in a suitable position the loose powder within the tire is caused to fall and accumulate on the solution at the punctured spot, the puncture being thus sealed over within the tube by the adhesion of a portion of the loose pulverized rubber to the surface of the spot or blob of adhesive solution, thus forming an adhesive quick-drying elastic mass or pad, the base of which—that is, the part in contact with the inner wall of the tube—is composed of rubber solution and the top surface of which—that is, the part toward the center of the tube—is composed of pulverized rubber, (see Fig. 3,) which, being dry and non-adhesive, prevents the inner walls of the tube from being stuck together by the solution and also confines the solution to a small circumscribed spot just over the puncture.

In the case of a single-tube tire, after the mending process above described has been carried out, a plug may be inserted in the usual way, and the adhesive pad, which is formed as above described, will prevent the plug from being blown out and also prevent leakage around its edges, the puncture being entirely sealed over on the inner side of the tube, the plug only serving to fill up the hole in the thickness of the tire.

Instead of using pulverized or granulated rubber alone I may use it mixed with some other pulverized or granulated substance, or I may use some other substance in powder or granulated form without the admixture of any rubber.

By my invention an elastic patch is provided on the inside of the tube or wire which does not in any way interfere with the inflation of the tire, nor in any way does it mar or disfigure the evenness of the outer surface of the tire.

Having fully described my invention, what I desire to claim and secure by Letters Patent is—

1. The combination with the inflatable tube of a pneumatic tire, of dry, pulverized or granulated vulcanized rubber loosely contained within such tube adapted to be accumulated by adhesion over a spot or blob of rubber solution injected through a puncture and to thus confine such solution to a small circumscribed spot and to form in conjunction with the injected rubber solution an elastic patch within the tube, substantially as herein shown and described.

2. The combination with the inflatable tube of a pneumatic tire, of a dry, pulverized or granulated substance loosely contained within such tube, adapted to be accumulated by adhesion over a spot or blob of adhesive solution injected through a puncture and to
5 thus confine such solution to a small circumscribed spot, and to form in conjunction with the injected adhesive solution a dry, elastic patch within the tube over the puncture, substantially as herein shown and described.

L. T. DARNAULT.

Witnesses:
B. J. B. MILLS,
CLAUDE K. MILLS.